United States Patent

Matsumoto et al.

[11] Patent Number: 5,303,061
[45] Date of Patent: Apr. 12, 1994

[54] APPARATUS FOR REJECTING TIME BASE ERROR OF VIDEO SIGNAL

[75] Inventors: Tokikazu Matsumoto; Fumiaki Koga, both of Osaka; Hiromu Kitaura, Osakasayama; Takashi Inoue, Osaka; Nobuyuki Ogawa, Takatsuki, all of Japan

[73] Assignee: Matsushita Electric Industrial Co., Ltd., Osaka, Japan

[21] Appl. No.: 894,923

[22] Filed: Jun. 8, 1992

[30] Foreign Application Priority Data

Jun. 18, 1991 [JP] Japan .................................. 3-145812

[51] Int. Cl.⁵ .............................................. H04N 9/89
[52] U.S. Cl. .................... 358/320; 358/310; 358/324
[58] Field of Search ............... 358/310, 319, 320, 324, 358/326, 17, 19, 330, 339, 11, 149, 138; 360/36.1, 36.2; H04N 9/89, 5/95

[56] References Cited

U.S. PATENT DOCUMENTS

| | | | |
|---|---|---|---|
| 4,212,027 | 7/1980 | Lemoine | 358/19 |
| 4,714,965 | 12/1987 | Yoshinaka et al. | 358/320 |
| 4,736,238 | 4/1988 | Moriyama et al. | 358/310 |
| 4,754,340 | 6/1988 | Nakagawa et al. | 358/326 |
| 4,860,089 | 8/1989 | Smith | 358/19 |
| 4,860,120 | 8/1989 | Yamashita | 358/330 |
| 4,987,491 | 1/1991 | Kaite et al. | 358/324 |

Primary Examiner—Tommy P. Chin
Assistant Examiner—Huy Nguyen
Attorney, Agent, or Firm—Stevens, Davis, Miller & Mosher

[57] ABSTRACT

A time base correcting apparatus for reducing hindrance to a carrier chrominance signal due to clock jitter, when a sampling clock is generated by a digital circuit. In the time base correcting apparatus, a video signal is sampled with a clock synchronized with the video signal to be written to an FIFO memory. The video signal is then read out therefrom with a fixed clock to remove time base changes of the video signal. The fixed read clock is generated by multiplying two different frequency signals together, where one of the signals has a lower frequency approximately equal to $(n+\frac{1}{4})f$ (where n is an arbitrary integer, and f is a horizontal sync frequency) and using one of the resultant sidebands obtained through use of a bandpass filter. The read clock frequency is separated by $\frac{1}{2}f$ from the other sideband frequency to reduce hindrance between the signals, and in turn to reduce viewable hindrances during the display of the video signal read out from the FIFO.

16 Claims, 5 Drawing Sheets

FIG. 5A IN CASE OF NTSC

FIG. 5C IN CASE OF PAL

APPARATUS FOR REJECTING TIME BASE ERROR OF VIDEO SIGNAL

BACKGROUND OF THE INVENTION

The present invention relates to a time base corrector, used with an image reproducing system such as a video disc player, in which a video signal is sampled to be digitized and the jitter of the video signal is removed.

A time base corrector (TBC) for removing the change in time base (jitter) of a video signal, used with a video disc and a VTR, is heretofore realized by sampling the video signal with a clock following the jitter of the video signal to write the resultant signal to a memory. At this time, the clock is generated using an analog VCO (voltage controlled oscillator) which is controlled by a PLL (phase locked loop). As an example for performing the full digital processing with PLL including VCO, as described in JP-A-2-58947, there is known a method in which a clock of low frequency is generated with a digital VCO, and the clock thus generated is multiplied by a frequency of a fixed oscillator to perform the frequency conversion to obtain a clock having a predetermined frequency. In this case, however, jitter is generated in the clock due an unnecessary frequency component which was produced during the processing, and the video signal is processed with that clock, and therefore, the jitter is also generated in the video signal. As a result, in the case where the video signal includes a carrier chrominance signal, there arises a problem in that a beat is generated in a chrominance signal.

SUMMARY OF THE INVENTION

It is therefore an object of the present invention to provide an apparatus for rejecting a time base error of a video signal in which no beat is generated in a chrominance signal.

It is another object of the present invention to provide means for generating a clock for a time base corrector with a digital processing.

It is still another object of the present invention to provide a time base corrector which is capable of coping with both the NTSC system and the PAL system by utilizing only one fixed oscillator.

The above objects can be attained in the following manner. Specifically, a video signal including a carrier chrominance signal is sampled by sampling means using a clock which is generated through the digital processing. The clock is obtained in such a way that two outputs of two oscillators of which the lower frequency is $(n+\frac{1}{2})\cdot fH$ (where n is an arbitrary integer and fH is a horizontal synchronizing signal frequency of the video signal) are multiplied by each other through a multiplier, and only one of an upper side wave and a lower side wave of spectra of the output of the multiplier is filtered through a band pass filter.

BRIEF DESCRIPTION OF THE DRAWINGS

FIG. 5A to 5D are spectrum diagrams showing spectra of a clock generated by the third embodiment of the present invention.

DESCRIPTION OF THE PREFERRED EMBODIMENTS

The preferred embodiments of the present invention will hereinafter be described on referring to the accompanying drawings.

Figure 1:
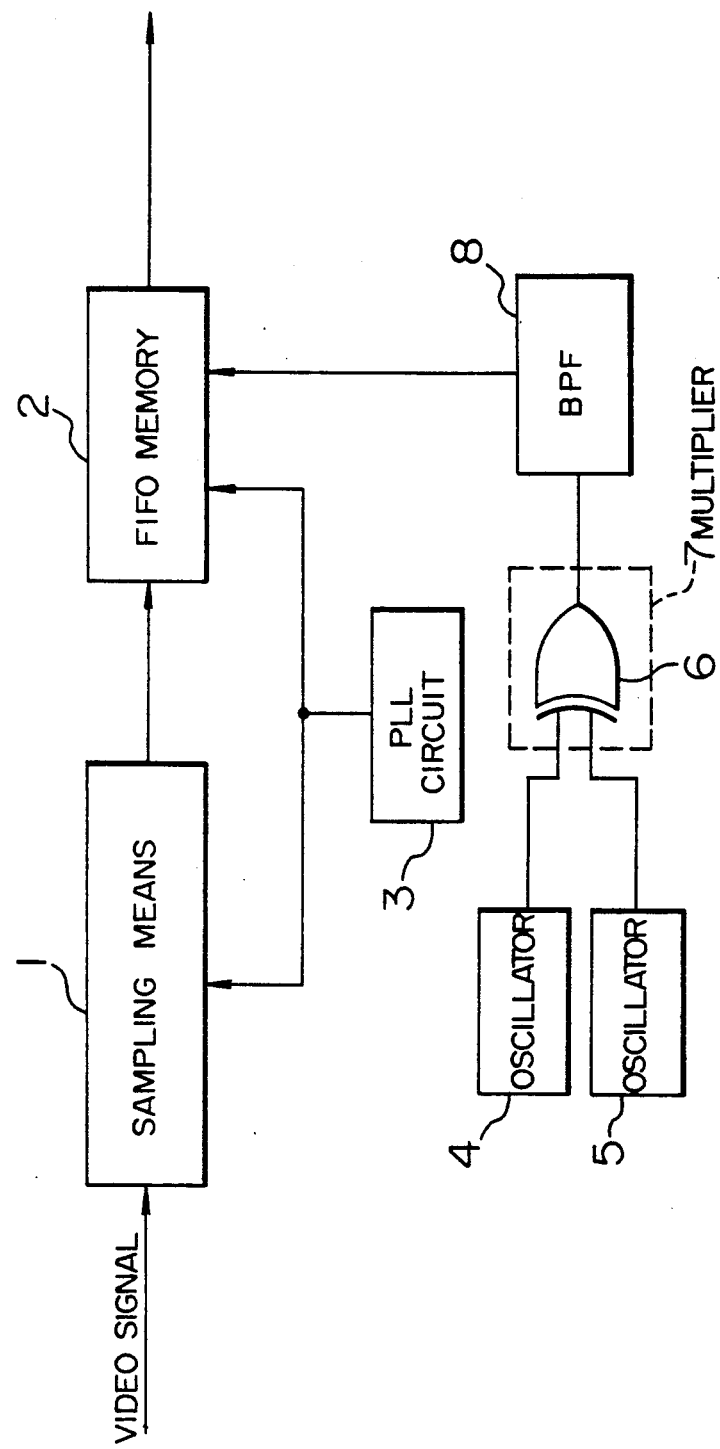
FIG. 1 is a block diagram showing a configuration of a first embodiment of the present invention.

FIG. 1 is a block diagram showing a configuration of an apparatus for processing a video signal in the first embodiment of the present invention. An input video signal is sampled by sampling means 1 to be written to an FIFO memory 2. When the following processings are to be digitally performed, an A/D converter is used as the sampling means 1. The FIFO memory 2 is a memory wherein a fixed capacity is provided and the data is read out in sequence from the data written earlier. Thus, in the FIFO memory 2, a write clock and a read clock are operated independently of each other. The write clock for each of the sampling means and the FIFO memory 2 is supplied by generating a clock locked in a carrier chrominance signal, for example, of the input video signal through a PLL circuit 3. Therefore, since even if the input signal contains jitter, the input signal is written to the FIFO memory 2 by the clock synchronized with the jitter, if that signal is read out by a clock having a fixed frequency, it is possible to obtain a video signal free from the jitter.

Figure 3A:
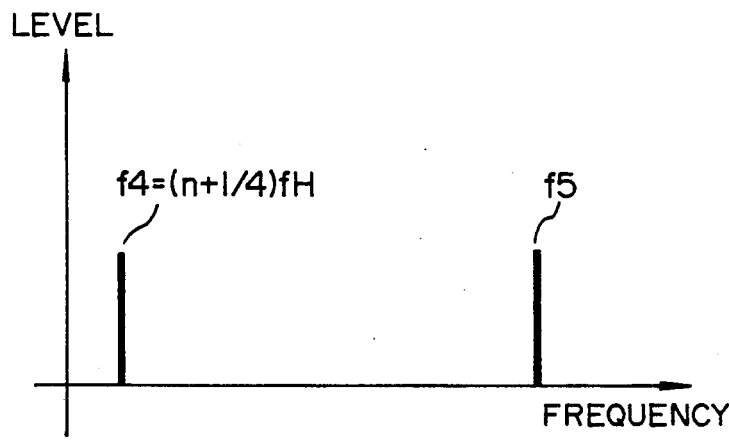
FIG. 3A to 3C are spectrum diagrams showing spectra of a clock generated by the first embodiment of the present invention.
Figure 3B:
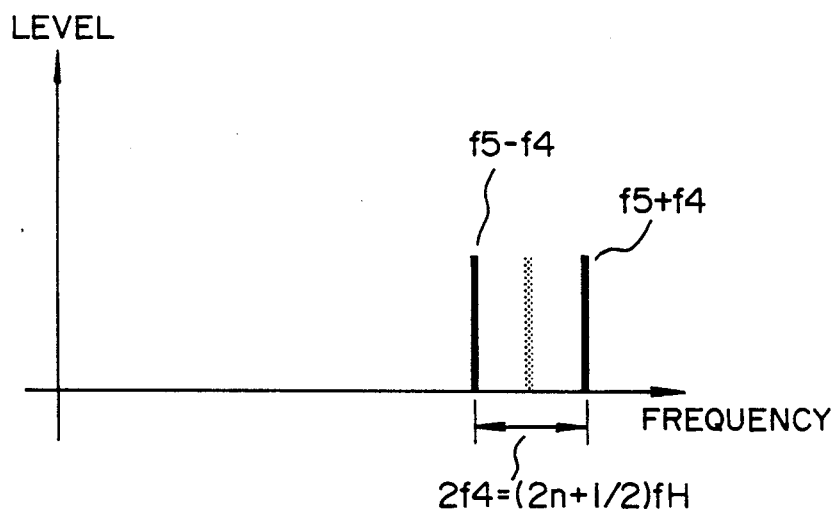
Figure 3C:
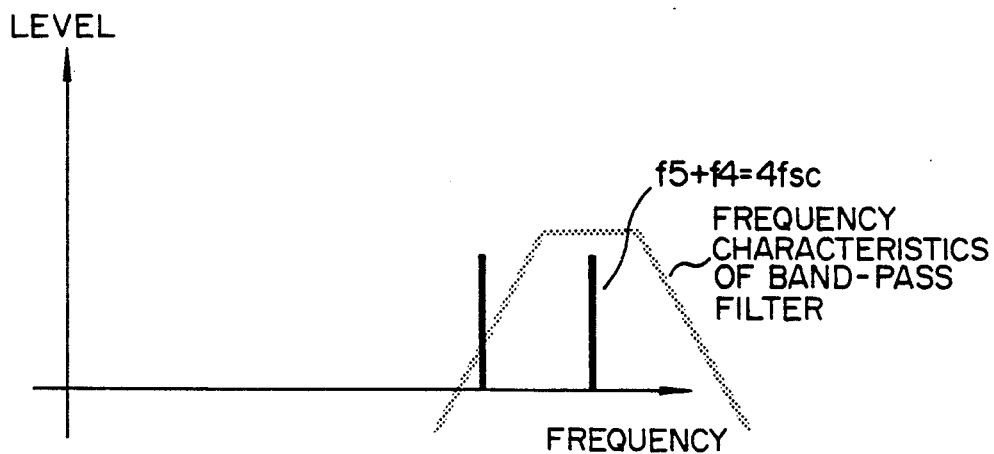

In the present invention, the read clock is generated by the combination of oscillators 4 and 5, and an EX-OR (exclusive OR) circuit 6 acting as a multiplier 7. The principle thereof will be explained on referring to FIG. 3. For example, it is assumed that the frequency of the oscillator 4 is lower than that of the oscillator 5, and the frequency of the oscillator 4 is f4 and that of the oscillator 5 is f5. At this time, the relationship of $f4=(n+\frac{1}{2})fH$ is established. FIG. 3(a) shows spectra of those frequencies. Next, if the two frequencies are multiplied by each other through the multiplier 7, the frequency component having a frequency of (f5−f4) and that having a frequency of (f5+f4) are produced as shown in FIG. 3(b). The frequency difference of the two components is (f5+f4)−(f5−f4), i.e., 2·f4. Then, by utilizing the above relationship, $2\cdot f4=(2\cdot n+1)fH$ is established (refer to FIG. 3(b)). In other words, the frequency difference is expressed by lo the horizontal synchronizing signal times the sum of the integer plus one over two, i.e., the relationship of the so-called ½ line offset. At this time, the frequency 4 times as large as that of the color subcarrier fsc, i.e., 4fsc is, for example, selected as the frequency of the component of higher frequency. If this frequency component is filtered through the band pass filter 8, the signal of 4fsc frequency is obtained (refer to FIG. 3(b)), and the resultant signal is used as the read clock for the FIFO memory 2.

According to the present embodiment, even if the cut-off characteristics of the band pass filter 8 are poor so that a little amount of lower side wave component of (f5−f4) frequency remains, the ½ line offset is applied to the clock of 4 fsc frequency. Therefore, the line offset is also applied to the harmful component which is present in the form of phase change between the video signal read out from the FIFO memory 2 and the carrier chrominance signal. That component is a color oblique line on the picture of the television. In this connection, the detection limit of the eye to the oblique line is low and thus that component is not remarkable at all.

In other words, there is provided the feature in that even if a filter which is low in cost and has slightly poor cut-off characteristics is used as the band pass filter 8, the chrominance signal is not hindered.

Figure 2:
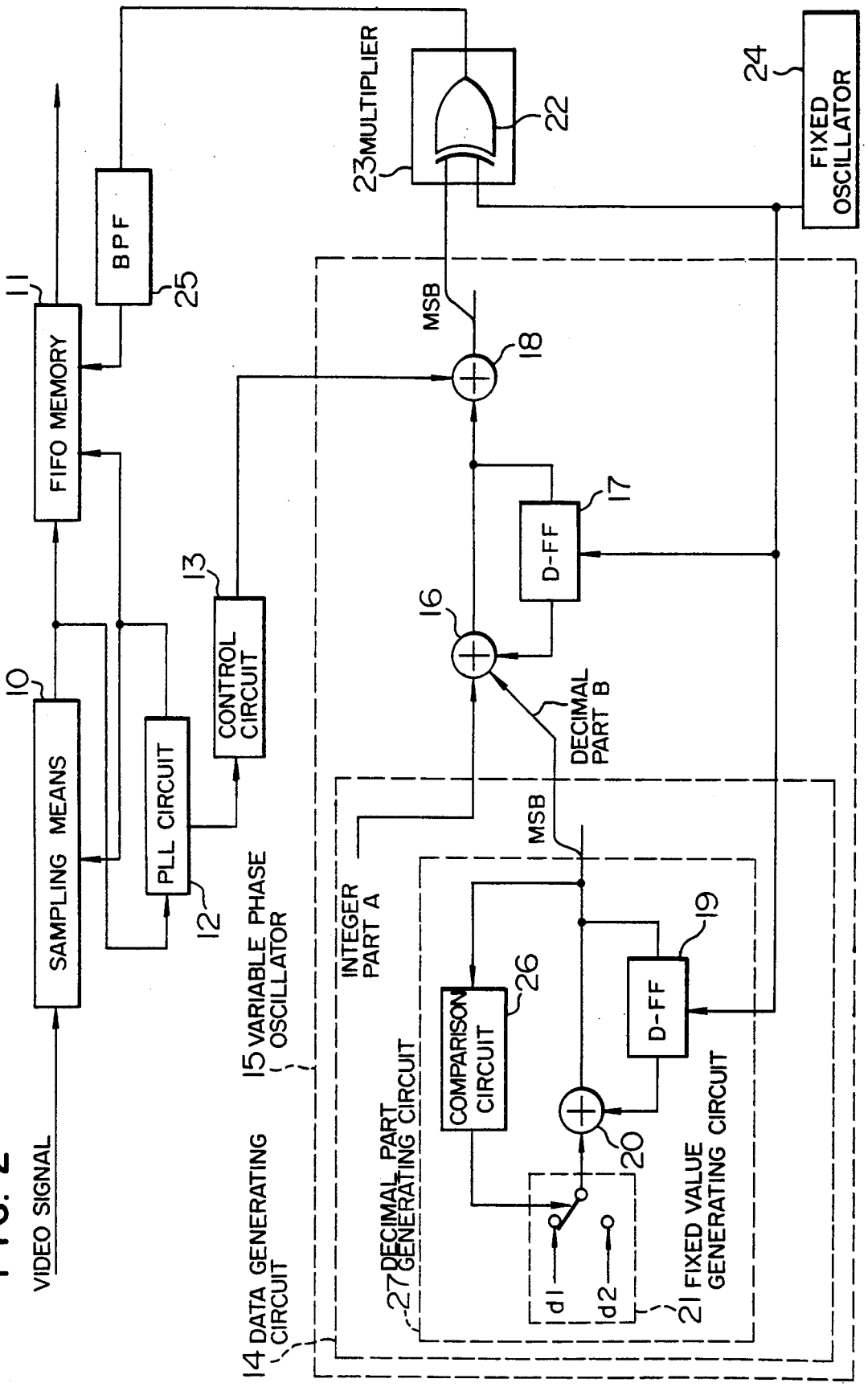
FIG. 2 is a block diagram showing a configuration of a second embodiment of the present invention.

Next, the second embodiment of the present invention will be described on referring to FIG. 2. A video signal which was inputted is, in the same manner as in the first embodiment, sampled by sampling means 10 to be written to an FIFO memory 11. The write clock is supplied by generating a clock synchronizing with the input video signal in a clock PLL circuit 12. At this time, the PLL circuit 12 has an input connected to the output of the sampling means and is operated in such a way as to synchronize with the burst signal and the horizontal synchronizing signal of the input video signal. However, since the phase error can be detected from those signals only every 1H (H is a horizontal synchronizing period of time), the circuit 12 cannot respond to rapid jitter of the input signal. Then, the error component which remains due to no response in the circuit 12 is removed in such a way that when accessing to the FIFO memory 11 for the read operation, the phase of the read clock is shifted and the feed forward control is performed. This method is heretofore called the velocity error correction. The present embodiment has the feature in which the shift of the clock phase can be digitally controlled. The method thereof will hereinbelow be explained.

In the present embodiment, the output from a variable phase oscillator 15 and that from a fixed oscillator 24 are multiplied by each other in a multiplier 23 employing an EX-OR 22, and one side band of the output of the multiplier 23 is filtered through a band pass filter 25 so that the resultant signal is used as the read clock for the FIFO memory 11. At this time, by controlling the phase of the output of the variable phase oscillator 15 through a control circuit 13, the phase of the read clock for the FIFO memory 11 which was obtained in the form of output of the band pass filter 25 is shifted.

Further, the operation of the variable phase oscillator 15 will be explained in detail. The variable phase oscillator 15 is made up of a data generating circuit 14 for generating data corresponding to the oscillating frequency, an adder 16, and a D flip flop 17 for generating data of saw-tooth-wave on the basis of that data, and an adder 18 for shifting the phase of the saw-tooth-wave data. The output from the adder 16 is fed to the D flip flop circuit 17 and then fed back to the input of the adder 16. By the provision of this configuration, the input data is accumulated every one clock. Since when the accumulated value exceeds the dynamic range of the adder 16, an overflow occurs, the output data is changed in the saw-tooth-wave shape. The frequency of the saw-tooth-wave is proportional to an input value x to the adder 16 and the clock frequency of the D flip flop 17. Now, assuming that the dynamic range of the adder 16 is D, and the clock frequency of the D flip flop 17, i.e., the oscillating frequency of the fixed oscillator 24 is fck, the oscillating frequency per input data is expressed by x·fck/D. Therefore, the oscillating frequency when the input data is x becomes x·fck/D.

Next, the description will be given using concrete values. It is assumed that the adder 16 is constructed by a 9-bit adder, and the oscillating frequency of the fixed oscillator 24 is 893.75fH. That is, D=512 and fck=893.75fH are assumed. Moreover, if x=9+17/55, the oscillating frequency of the variable phase oscillator 15 is given by (9+17/55)·893.75fH/512, i.e., 16.25fH. How to set x will be explained later. By adding the output of the control circuit 13 to the saw-tooth-wave data having a frequency of 16.25fH, the phase can be shifted. Since the adder 16 has 9 bits, 512 corresponds to the phase of 360 degrees. Therefore, if the data is added by 1 through the adder 18, the phase of 360/512=0.73125 degrees can be shifted. Next, if only the most significant bit of the output of the adder 18 is taken out, since this signal is a rectangular wave having an oscillating frequency of 16.25fH, it can be analogically multiplied by the output of the fixed oscillator 24 using the EX-OR 22. Since the oscillating frequency of the fixed oscillator 24 is 893.75fH, two frequency components, i.e., the component having a frequency of 893.75fH+16.25fH=910fH and the component having a frequency of 893.75fH−16.25fH=877.5fH are produced as the output of the EX-OR 22. Then, only the frequency component of 910fH frequency is filtered through the band pass filter 25 to be used as the clock. At this time, even if with the characteristics of the band pass filter 25 are somewhat poor so that a little amount of component of 877.5fH frequency remains, since the difference therebetween is 32.5fH and the ½ line offset is applied as described in the first embodiment, the chrominance signal is not remarkably hindered at all.

Next, how to set x will be explained in detail. In order to perform the operation as has already been described, it is necessary to set a value including a decimal part such as x=9+17/55. Then, x is divided into an integer part a and a decimal part b. In other words, in this case, a=9 and b=17/55. The data generating circuit 14 serves to generate such data. With respect to a, the data generating circuit 14 gives the integer value directly to the adder 16. In this case, the integer value is 9. With respect to b, the data train in which the seventeen data of 1 is included in the fifty five data is generated by a decimal part generating circuit 27 to be given to a carrier input of the adder 16. That is, with respect to b, the data having an average of 17/55 is given.

The data train in which the seventeen data of 1 is included in the fifty five data can be generated in the following manner for example. The adder 16 and the D flip flop 17 are similarly combined. In this connection, the dynamic range of the adder 16 is set to 55. Then, if 17 is sequentially added to the input to be accumulated, the overflow occurs in the additions of 55 times by 17 times. That is, the desired data is provided at MSB (the most significant bit) of the output of the adder 16. In general, however, except the case of 2 to the n-th power, the construction of the adder having the dynamic range is complicated. Then, in the present embodiment, when the output of the adder 20 is fed back thereto with being delayed by one clock through the D flip flop 19, the output of the adder 20 is compared with a fixed value in a comparison circuit 26, and when the output is larger than the fixed value, a fixed value generating circuit 21 is switched so that a different value is added, whereby the generation of the data train is realized by the adder for 2 to the n-th power.

The description will be given using concrete values. It is assumed that the two values switched by the fixed value generating circuit 21 are d1=17 and d2=26 and the comparison circuit 26 is controlled in such a way that when the data is more than or equal to 38, the switch circuit 21 selects d2, and when the data is less than 38, the circuit 21 selects d1. As a result, the adder 20 overflows when the accumulated value becomes equivalently 55. When the output of the D flip flop 19 is 38 for example, d1 (i.e., 17) is added in the adder 20 and of which output becomes temporarily 38+17=44. However, the next moment, the input of the adder 20 is switched to d2=26, and the output becomes 38+26=64. As a result, the adder 20 overflows so that its output becomes zero. That is, if the output exceeds 55, the overflow occurs. Thus, an arbitrary overflow (55, in this case) can be realized by the adder for 2 to the n-th power.

By the provision of the above configuration, the chrominance signal can be prevented from being hindered, and the velocity error correction can be realized accurately by the digital processing.

Next, the third embodiment of the present invention will be explained in detail on referring to the accompanying drawings.

Figure 4:
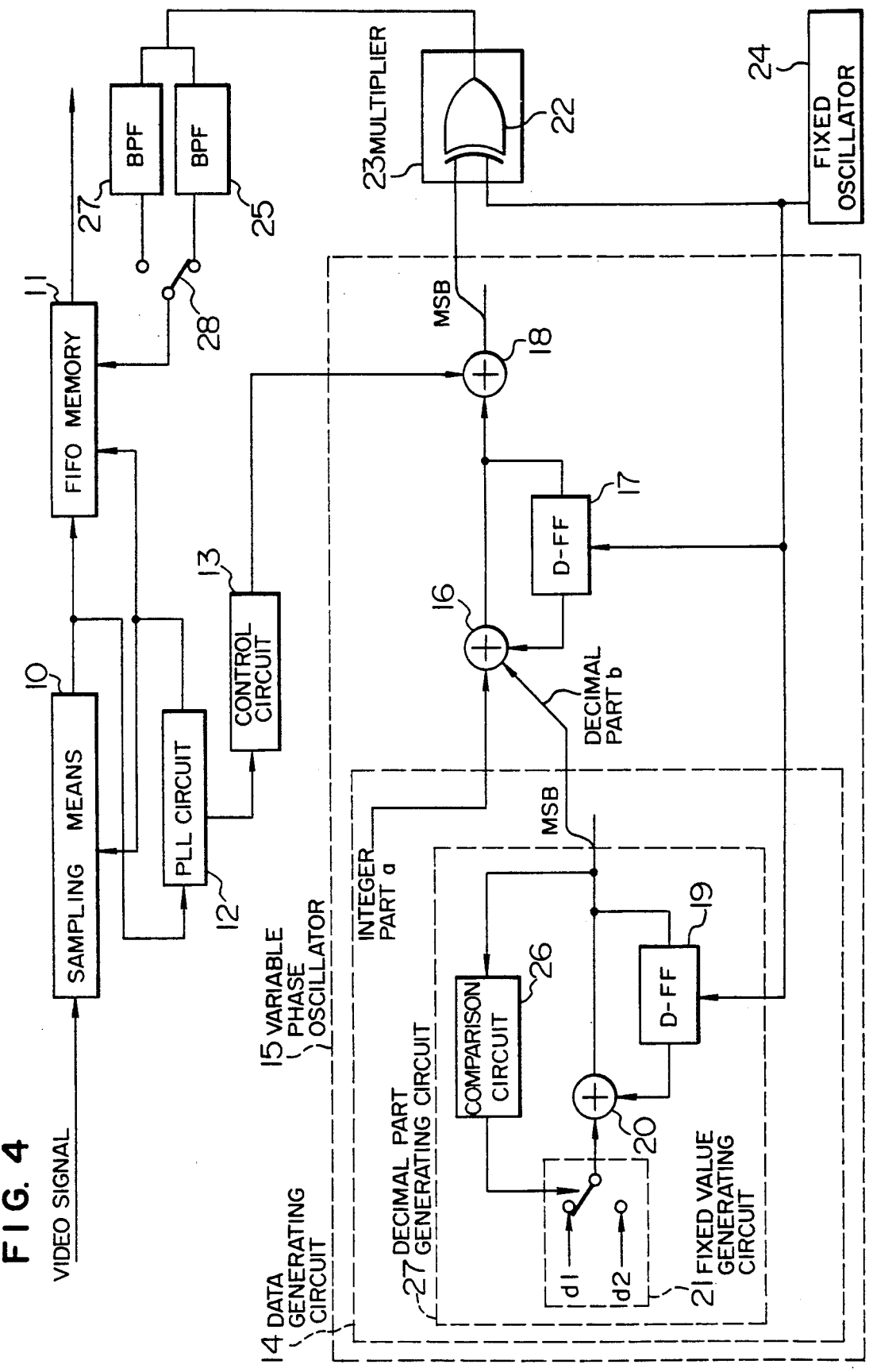
FIG. 4 is a block diagram showing a configuration of a third embodiment of the present invention.

FIG. 4 is a block diagram showing a configuration of an apparatus for processing a video signal in the third embodiment of the present invention. The difference in configuration of the present embodiment from the second embodiment is that a band pass filter 27 and a switch circuit 28 are additionally provided. The present embodiment is effective in the case where a second embodiment is made to correspond to both the NTSC system and the PAL system. The basic operation of the present embodiment is the same as that of the second embodiment except that the read clock of the FIFO memory 11 is selected in correspondence to the NTSC system and the PAL system by switching the output of the band pass filter 27 and that of the band pass filter 25 through the switch circuit 28. In the case where the present embodiment is applied to the laser disc player, it is advantageous that as the frequency of the sampling clock, 910fHn is used in the case of NTSC and 960fHp is used in the case of PAL. Then, fHn represents the frequency of the horizontal synchronizing signal of the NTSC system, and fHp represents the frequency of the horizontal synchronizing signal of the PAL system. In the case of the NTSC system, 910fHn is 4 times as large as the frequency of the subcarrier, and in the case of the PAL system, 960fHp is 4 times as large as the frequency of the pilot burst signal of the laser disc player. For this reason, such frequencies are selected.

Figure 5B:
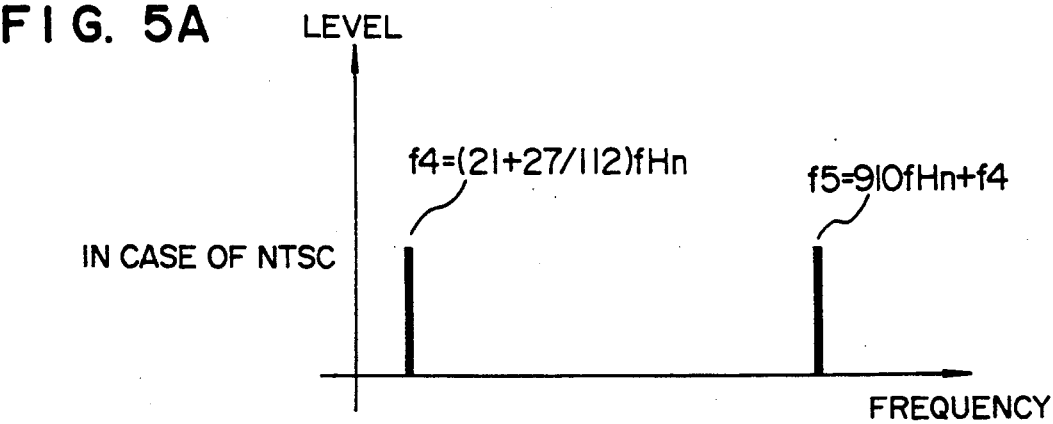
Figure 5B:
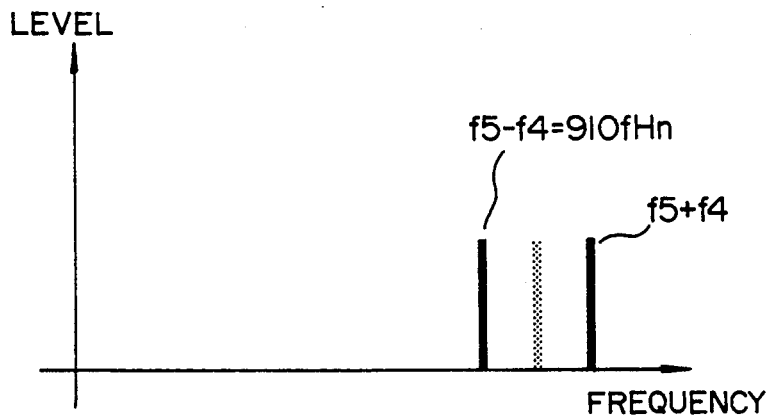
Figure 5D:
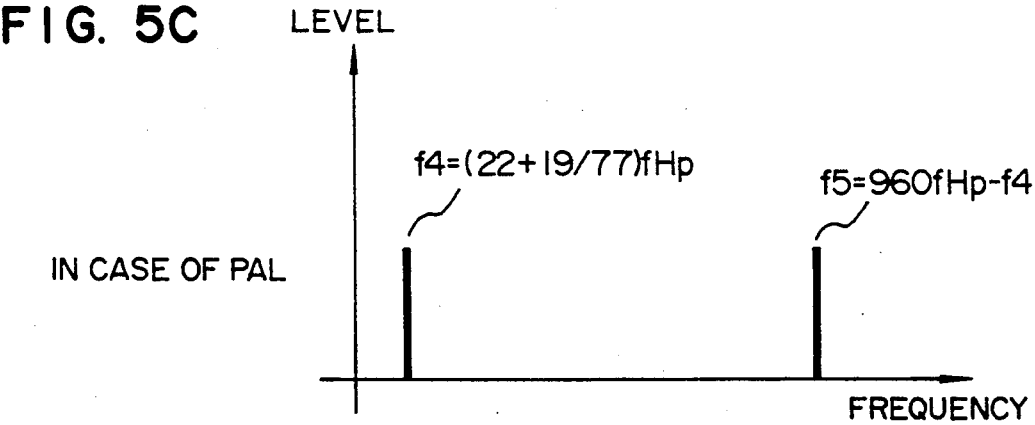
Figure 5D:
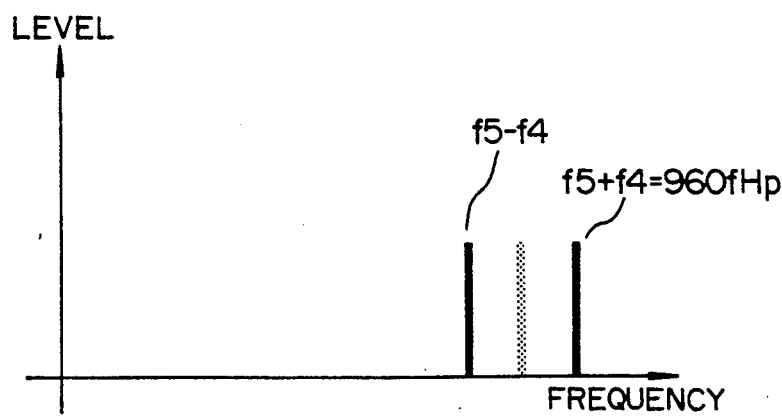

The explanation will hereinbelow be given to the generation of the clock frequency with respect to NTSC and PAL, as just described above, on referring to FIG. 5. FIGS. 5(a) and 5(b) are spectrum diagrams each showing an oscillating frequency f5 of the fixed oscillator 24 and an oscillating frequency f4 of the variable phase oscillator 15. Moreover, FIGS. 5(b) and 5(d) are spectrum diagrams each showing frequencies of the output of the multiplier 23. If (21+27/112)fHn is selected as f4 and (910fHn+f4) is selected as f5 in the case of the NTSC system, the frequency of the lower side wave of the output of the multiplier 23 becomes 910fHn as shown in FIG. 5(b). In this case, the band pass filter 27 for filtering a signal of 910fHn frequency is selected by the switch circuit 28. If (22+19/77)fHp is selected as f4 and (960fHp+f4) is selected as f5 in the case of the PAL system, the frequency of the upper side wave of the output of the multiplier 23 becomes 960fHp as shown in FIG. 5(d). In this case, the band pass filter 25 for filtering a signal of 960fHp frequency is selected by the switch 28.

The reason for selecting such frequencies as f4 is based on the following respects.

(1) The absolute frequency of f5 in the case of NTSC is equal to that of f5 in the case of PAL.

Since the frequency of the fixed oscillator 24 in the case of NTSC is equal to that of the fixed oscillator 24 in the case of PAL from this condition, for example, only one kind of quartz oscillator may be provided.

(2) f4 is near the ¼ line offset as much as possible.

Although the reason for selecting the ¼ line offset was described in the second embodiment, there is no condition for fulfilling the condition (1) by a numeric value of just ¼. However, if a numeric value is sufficiently near ¼, there can be obtained the same effect as in the second embodiment.

It will hereinbelow be shown that f4 fulfills the condition (1). It is well known that with respect to fHn and fHp, the following condition is fulfilled. That is, 858fHn=864fHp=13.5 MHz is established. In other words, fHn is 13.5/858 MHz and fHp is 13.5/864 MHz. Accordingly, the expression of f5 (931+27/112)×13.5/858=(938−19/17)×13.5/864=14.6523945 MHz is established. Incidentally, the integer part a and the decimal part generating circuit in the data generating circuit 14 for generating f4 as described above may be set in the same manner as in the second embodiment. As for the concrete value, if the adder 20 has 9 bits, a=11 and the average of the decimal part is 5443/8023 in the case of NTSC, while a=12 and the average of the decimal part is 3524/24069 in the case of PAL.

As set forth hereinabove, according to the present invention, the read clock that is used when the data which was written to the FIFO memory 2 using the clock synchronizing with the video signal is read out is obtained in such a way that the outputs of the two oscillators 4 and 5 for oscillating respective signals of which lower frequency is (n+¼)·fH are multiplied by each other and one of the resultant side bands is filtered through the band pass filter 8, whereby it is possible to realize the apparatus for processing a video signal in which the chrominance signal is free from the hindrance and which is simple in configuration.

Moreover, in the present invention, in order to digitally process the velocity error correction with accuracy, the fixed oscillator 24 and the variable phase oscillator 15 which is operated with the output of the fixed oscillator 24 as the clock are combined with each other to generate the read clock for the FIFO memory 11, whereby it is possible to realize the apparatus for rejecting a time base error of a video signal of which chrominance signal is free from the hindrance and which is capable of responding to even the rapid jitter.

Further, the present invention can cope with both the NTSC system and the PAL system, and can also cope therewith with a fixed oscillator oscillating the same frequency with respect both the systems. Thus, it is possible to simplify the circuit.

What is claimed is:

1. An apparatus for rejecting a time base error of a video signal comprising:
a PLL (phase locked loop) circuit for generating a clock signal synchronized with said video signal, said video signal including a carrier chrominance signal modulated with a color subcarrier;
sampling means for sampling said video signal with said clock signal generating by said PLL circuit;
a FIFO (first-in first-out) memory for performing write the read operations with independent clock signals, the video signal sampled by said sampling means being written to said FIFO memory with the clock signal generated by said PLL circuit;

a first oscillator for generating a first signal having a predetermined frequency;

a second oscillator for generating a second signal having a lower frequency than the frequency of said first signal, the lower frequency being $(n+\frac{1}{4})$ fH (where n is an arbitrary integer and fH is a horizontal synchronizing frequency of said video signal);

a multiplier for multiplying said first and second signals by each other and generating an output; and a band pass filter for filtering one of an upper side and a lower side of a spectra of said output of said multiplier to generate a filtered signal and outputting said filtered signal to said FIFO memory read as a clock signal.

2. An apparatus according to claim 1, wherein each output of said first the second oscillators is a rectangular wave, and an EX-OR (exclusive OR) circuit is used as said multiplier.

3. An apparatus according to claim 4, wherein a sum or difference of the frequencies of said first the second signals is 4 times a frequency of the color subcarrier.

4. An apparatus for rejecting a time base error of a video signal comprising:

a PLL (phase locked loop) circuit for generating a clock signal synchronized with said video signal and outputting a residual phase error signal, said video signal including a carrier chrominance signal modulated with a color subcarrier;

sampling means for sampling said video signal with said clock signal generating by said PLL circuit;

a FIFO (first-in first-out) memory for performing write and read operations with independent clock signals, said video signal sampled by said sampling means being written to said FIFO memory with the clock signal generated by said PLL circuit;

a fixed oscillator for generating a first signal having a predetermined frequency;

a variable phase oscillator for generating a second signal having a frequency equal to $(n+\frac{1}{4})\cdot fH$ (where n is an arbitrary integer and fH is a horizontal synchronizing frequency of said video signal);

a multiplier for multiplying said second signal of said variable phase oscillator by said first signal of said fixed oscillator and generating an output;

a band pass filter for filtering one of an upper side and a lower side of a spectra of said output of said multiplier to generate a filtered signal the outputting said filtered signal to said FIFO memory as a read clock signal; and a control circuit for controlling phase of said second signal generated by said variable phase oscillator in accordance with said residual phase error signal.

5. An apparatus according to claim 4, wherein said variable phase oscillator includes a data generating circuit for generating and outputting data proportional to a predetermined frequency, a first adder for adding said output data of said data generating circuit, a D flip flop circuit for delaying an output of said first adder by one clock cycle of said first signal generated by said fixed oscillator and feeding back the output of said D flip flop circuit to said first adder, and a second adder for adding an output of said control circuit and an output of said first adder;

wherein a most significant bit of an output of said second adder is used as the output of said variable phase oscillator, an EX-OR (exclusive OR) circuit is used as said multiplier, and a clock signal for said D flip flop circuit is used as an output of said fixed oscillator.

6. An apparatus according to claim 5, wherein a sum or difference of the frequencies of said first and second signals is 4 times a frequency of the color subcarrier.

7. An apparatus according to claim 5, wherein said data generated by said data generating circuit includes an integer part a and a decimal part b; the
said data generating circuit includes an integer generating unit for setting said integer part a and a decimal part generating circuit for generating a binary data train, wherein an average of said binary data train is b.

8. An apparatus according to claim 7, wherein said decimal part generating circuit includes a fixed value generating circuit for switching between two fixed values, a third adder for adding an output of said fixed value generating circuit, a D flip flop circuit for delaying an output of said third adder by one clock cycle of said first signal of said fixed oscillator so as to feed back the output to said third adder, and a comparison circuit for comparing the output of said third adder with a predetermined value, and switching the output value of said fixed value generating circuit in accordance with said comparison, wherein a most significant bit of the output of said third adder is provided as said decimal part b.

9. An apparatus for rejecting a time base error of a video signal comprising:

a PLL (phase locked loop) circuit for generating a clock signal synchronized with said video signal, said video signal including a carrier chrominance signal modulated with a color subcarrier;

sampling means for sampling said video signal with said clock signal generated by said PLL circuit;

a FIFO (first-in first-out) memory for performing write the read operations with independent clock signals, the video signal sampled by said sampling means being written to said FIFO memory with the clock signal generated by said PLL circuit;

a first oscillator for generating a first signal having a predetermined frequency;

a second oscillator for switching between a plurality of frequencies in accordance with an external mode signal and generating a second signal in accordance with said switching, each of the plurality of frequencies being lower than the frequency of said first signal and fulfilling $(n+a)\cdot fH$ (where n is an arbitrary integer, a is a rational number approximately equal to $\frac{1}{4}$, and fH is a horizontal synchronizing frequency of the video signal);

a multiplier for multiplying said first and second signals by each other and generating an output;

a first band pass filter for filtering an upper side of a spectra of said output of said multiplier;

a second band pass filter for filtering a lower side of the spectra of the output of said multiplier; and switching means for switching between outputs of said first and second band pass filters and supplying an output to said FIFO memory as a read clock signal.

10. An apparatus according to claim 9, wherein each output of aid first and second oscillators is a rectangular wave, and an EX-OR (exclusive OR) circuit is used as said multiplier.

11. An apparatus according to claim 9, wherein said second oscillator switches between first and second oscillating frequencies, a difference between the second oscillating frequency and the oscillating frequency of said first signal of said first oscillator is 910 times the frequency of a horizontal synchronizing signal used in an NTSC system, and a sum of the second oscillating frequency and the oscillating frequency of said first signal of said first oscillator is 960 times the frequency of a horizontal synchronizing signal used in a PAL system.

12. An apparatus for rejecting a time base error of a video signal comprising:
   a PLL (phase locked loop) circuit for generating a clock signal synchronized with said video signal and outputting a residual phase error signal, said video signal including a carrier chrominance signal modulated with a color subcarrier;
   sampling means for sampling said video signal with said clock signal generating by said PLL circuit;
   a FIFO (first-in first-out) memory for performing write and read operations with independent clock signals, said video signal sampled by said sampling means being written to said FIFO memory with the clock signal generated by said PLL circuit;
   a first oscillator generating a first signal having a predetermined frequency;
   a second oscillator for switching between a plurality of frequencies in accordance with an external mode signal and generating a second signal in accordance with said switching, each of the plurality of frequencies being lower than the frequency of said first signal and fulfilling (n+a)·fH (where n is an arbitrary integer, a is a rational number approximately equal to ¼, and fH is a horizontal synchronizing frequency of the video signal).
   a multiplier for multiplying said second signal of said second oscillator by said first signal of said first oscillator and generating an output signal;
   a first band pass filter for filtering and upper side of a spectra of said output of said multiplier;
   a second band pass filter for filtering a lower side of the spectra of said output of said multiplier;
   switching means for switching between outputs of said first the second band pass filters and supplying an output to said FIFO memory as a read clock signal; and
   a control circuit for controlling the phase of said second oscillator in accordance with said residual phase error signal.

13. An apparatus according to claim 12, wherein said second oscillator includes a data generating circuit for generating and outputting data proportional to a predetermined frequency, a first adder for adding said output data of said data generating circuit, a D flip flop circuit for delaying an output of said first adder by one clock cycle of said first signal generated by said fixed oscillator and feeding back the output of said D flip flop circuit to said first adder, and a second adder for adding an output of said control circuit and an output of said first adder;
   wherein a most significant bit of an output of said second adder is used as the output of said second oscillator, an EX-OR circuit is used as said multiplier, and a clock signal for said D flip flop circuit is used as an output of said first oscillator.

14. An apparatus according to claim 13, wherein said second oscillator switches between first the second oscillating frequencies, a difference between said first oscillating frequencies, a difference between said first oscillating frequency and the oscillating frequency of said first oscillator is 910 times a frequency of a horizontal synchronizing signal of an NTSC system, and a sum of said first oscillating frequency and the oscillating frequency of said first oscillator is 960 times a frequency of a horizontal synchronizing signal of a PAL system.

15. An apparatus according to claim 13, wherein said data generated by said data generating circuit includes an integer part a and a decimal part b; the
   said data generating circuit includes an integer generating unit for setting said integer part a and a decimal part generating circuit for generating a binary data train, wherein an average of said binary data train is b, said a and said b being selected from a plurality of predetermined values in accordance with said external mode signal.

16. An apparatus according to claim 15, wherein said decimal part generating circuit includes a fixed value generating circuit for selecting between plural sets of fixed values in accordance with said external mode signal and switching between two fixed values in each set, an adder for adding an output of said fixed value generating circuit, a D flip flop circuit for delaying an output of said adder by one clock cycle of said first signal to again feed back the output to said adder, and a comparison circuit for comparing the output of said adder with a selectable fixed value switching the output value of said fixed value generating circuit in accordance with a result of said comparison, and a most significant bit of the output of said adder is provided as said decimal part b.

* * * * *